United States Patent
Tait et al.

(10) Patent No.: US 8,566,688 B2
(45) Date of Patent: Oct. 22, 2013

(54) METHOD OF CERTIFYING MULTIPLE VERSIONS OF AN APPLICATION

(75) Inventors: Mark-Andrew Ray Tait, Beaverton, OR (US); Larry Alan Westerman, Portland, OR (US)

(73) Assignee: Ensequence, Inc., Portland, OR (US)

( * ) Notice: Subject to any disclaimer, the term of this patent is extended or adjusted under 35 U.S.C. 154(b) by 605 days.

(21) Appl. No.: 12/552,220

(22) Filed: Sep. 1, 2009

(65) Prior Publication Data

US 2011/0055672 A1    Mar. 3, 2011

(51) Int. Cl.
*G06F 11/10* (2006.01)

(52) U.S. Cl.
USPC .......................................................... 714/807

(58) Field of Classification Search
USPC .......................................................... 714/807
See application file for complete search history.

(56) References Cited

U.S. PATENT DOCUMENTS

| | | |
|---|---|---|
| 5,247,524 A | 9/1993 | Callon |
| 5,454,000 A | 9/1995 | Dorfman |
| 5,931,967 A | 8/1999 | Shimizu et al. |
| 6,038,694 A | 3/2000 | Swallow |
| 6,182,267 B1 | 1/2001 | Kidd et al. |
| 6,292,569 B1 | 9/2001 | Shear et al. |
| 6,324,669 B1 * | 11/2001 | Westby ........................ 714/805 |
| 6,728,930 B2 | 4/2004 | Poeluev |
| 6,851,052 B1 | 2/2005 | Graveman |
| 7,120,802 B2 | 10/2006 | Shear et al. |
| 7,213,266 B1 | 5/2007 | Maher et al. |
| 7,254,719 B1 | 8/2007 | Briceno |
| 7,386,627 B1 | 6/2008 | Lango et al. |
| 7,415,613 B2 | 8/2008 | Impson et al. |
| 7,484,096 B1 | 1/2009 | Garg et al. |
| 7,500,170 B2 | 3/2009 | Wiatrowski et al. |
| 2006/0193470 A1 * | 8/2006 | Williams ...................... 380/259 |
| 2007/0053513 A1 * | 3/2007 | Hoffberg ...................... 380/201 |
| 2009/0307640 A1 * | 12/2009 | Chapman et al. ................. 716/4 |
| 2010/0077225 A1 * | 3/2010 | Salgado et al. ............... 713/189 |
| 2010/0098318 A1 * | 4/2010 | Anderson ..................... 382/137 |

* cited by examiner

*Primary Examiner* — Albert Decady
*Assistant Examiner* — Enam Ahmed
(74) *Attorney, Agent, or Firm* — Kristine Elizabeth Matthews

(57) ABSTRACT

A first check code is computed by applying an algorithm to a proper subset of a first body of data. A second check code is computed by applying the algorithm to an equivalent proper subset of a second equivalent body of data. The two check codes are compared. The extent of the proper subset of the first body of data is determined by a semantic analysis of the first body of data. Multiple versions of an application, when the semantic changes between the applications are inconsequential, may then be certified by ignoring the non-significant modifications and ensuring the integrity of the remainder of the content.

10 Claims, 6 Drawing Sheets

METHOD OF CERTIFYING MULTIPLE VERSIONS OF AN APPLICATION

FIELD OF THE INVENTION

This invention relates generally to the generation of a certificate to validate the legitimacy of data transmitted between multiple computer systems.

BACKGROUND OF THE INVENTION

A common requirement in many computerized systems is the need to validate or verify that the contents of a body of data have not been modified in the course of storing, retrieving, transmitting, receiving, or otherwise manipulating the data. Modifications in such circumstances might result from errors during the process of converting the contents of a body of data from one physical form (say, magnetization domains on a disk platter) to another physical form (say, electromagnetic waves), or may occur as a result of deliberate tampering with the contents of the body of data (say, through the deliberate and malicious introduction of a worm into an email message).

A common technique for meeting the data validation requirement is to process the contents of a body of data with an algorithm that generates a secondary datum, smaller in size than the original body of data. This secondary datum is then associated with the original body of data. Subsequent to some manipulation of the original body of data, the manipulated contents of the data are processed with the same algorithm to generate a new version of the secondary datum. The two versions of the secondary datum are compared, and a mismatch is taken to signal a modification of the contents of the body of data.

Many techniques are known in the prior art for computing the secondary datum, which is often called a check code or checksum. A simple mechanism is to start with a zero byte, then perform an exclusive-OR on the result with each successive byte of body of data. The one's complement of the final result is used as the check code. If the one's complement byte is appended to the original body of data, an exclusive-OR of all of the bytes in the augmented data will yield a zero result. As a further example, International Standard ISO/IEC 8473-1, "Information technology—Protocol for providing the connectionless-mode network service: Protocol specification", defines an arithmetic checksum computed for this purpose. Similarly, U.S. Pat. No. 5,247,524 describes an exemplary method of computing a checksum for transmitted data.

A tradeoff arises between the complexity of the algorithm used to compute the secondary datum and the reliability of the algorithm in detecting modifications between a first and second version of a data module. For example, the exclusive-OR algorithm described above is insensitive to byte order rearrangement of the contents of the data module. A more complex algorithm, the cyclic redundancy check (CRC) algorithm, uses a division/remainder procedure that is sensitive to byte order, but has a higher computational cost. Like the exclusive-OR algorithm, the CRC algorithm can easily be fooled by a deliberate modification of the contents of the data module that yields the same CRC check code as the original contents.

Still more complex algorithms, known as cryptographic hash functions, have been developed that are straightforward to compute but produce check codes with the characteristic that it is infeasible to modify a data module without changing its check code.

Several systems have been described that compute check codes based on a subset of the content of a data module. These systems seek to reduce the cost of computing the check code, or to overcome weaknesses in the check code algorithm to enhance the resulting security of the check code system. U.S. Pat. No. 5,450,000 describes a method of selecting a randomly or pseudo-randomly chosen subset of the contents of a block of data when computing a check code. The method of selecting the subset is independent of the contents of the block of data. U.S. Pat. No. 7,386,627 describes a method for computing a checksum wherein two checksums are computed from two portions of data payload, then combined to yield a final checksum. In '627, the two portions of the data packet are mutually exclusive parts of the payload, but need not together constitute the entire payload. U.S. Pat. No. 7,484,096 describes a method for comparing a first body of data and a second body of data by computing check codes for each body of data and comparing the check codes, and by sampling the content of each body of data with a common sampling algorithm, and comparing the sampled content. U.S. Pat. No. 7,500,170 describes a system in which a first portion of the content of a data block is modified based on a second portion of the content of the data block, and a check code is computed based only on the first portion of the data block. The effect of the system of '170 is that the check code depends upon the entire content of the data block, even though the check code computation does not directly utilize the entire content of the data block. In each of these examples from the prior art, the selection of a subset of the data is performed without reference to the content or meaning of the data.

Integrity of data is of particular significance in the area of interactive television (iTV) application broadcast and execution. An iTV application comprises one or more binary data blocks that are broadcast with conventional video and audio content for reception and execution on a set-top box (STB). A malformed or errant iTV application may cause disruption to the normal functionality of an STB, the resolution of which may be beyond the capability of the home viewer and may necessitate an expensive service call to remedy. For this reason, each application intended for broadcast undergoes an extensive certification process, in which the application is broadcast through a delimited broadcast infrastructure to a representative sample of STB models. The execution of the application is monitored by trained technicians and engineers, and a series of tests is performed to ensure that the application meets a set of certification criteria. Once an application meets the certification criteria, an encrypted certification code is affixed to the broadcast content; when a broadcast application is downloaded by an STB, the certification code is decrypted to ensure that the application can be safely executed. The certification process introduces significant cost and delay, raising the investment for and decreasing the speed of developing and deploying new iTV applications.

These factors are at odds with the potentially-lucrative emerging market for interactive television advertisements. Advertisers and broadcast intend to provide interactive experiences tied to short advertisement segments, in some cases targeting specific areas or individuals with appropriate content. Such targeted advertising will involve the creation of multiple versions of iTV applications, and the certification of large numbers of applications will introduce unacceptable costs into the advertising campaign budgets. In some cases the differences between the multiple versions might be as simple as substituting different textual or image content into a basic iTV application framework, an example of which is shown schematically in FIG. 1. The graphical display of an exemplary iTV application 100 comprises a text banner 110 and an image 120. In this simple application the text banner and image are displayed over the underlying video content of the advertisement, and automatically disappear after a brief period of visibility. Two versions 130, 140 of the application are shown with individual text content and graphic images. While a mere change of text and image content may not violate any of the certification criteria, such modifications will alter the broadcast content, which may trigger a requirement for a new certification process.

U.S. Pat. No. 6,851,052 describes a probabilistic method for computing a validation code that is insensitive to small numbers of bit errors in transformed data. However, the method of '052 does not distinguish the location of bit errors and thus cannot discriminate between errors in significant regions and in non-significant regions of the data.

What is required is a method of validating the content of a block of data that is capable of ignoring non-significant modifications to the data while ensuring the integrity of the remainder of the content.

SUMMARY OF THE INVENTION

The present invention provides methods and systems for comparing two bodies of data.

The present invention provides a computerized method for comparing a first body of data and a second equivalent body of data by computing a first check code from the first body of data and a second check code from the second equivalent body of data and comparing the first check code and second check code for equality, characterized in that computation of the first check code from the first body of data is performed by applying an algorithm to a proper subset of the contents of the first body of data, computation of the second check code from the second equivalent body of data is performed by applying the algorithm to the equivalent proper subset of the contents of the second equivalent body of data, and the extent of the proper subset is determined from a semantic analysis of the first body of data.

The present invention further provides for specifying the proper subset of the contents of a body of data by use of a mask, and by applying the same mask to a first body of data and a second body of data.

The present invention still further provides for determining the extent of the proper subset by comparing each semantic sub-element of a body of data with a list of two or more criteria, and including in the proper subset each of those sub-elements for which any modification of the sub-element violates at least one criterion in the list of criteria.

The present invention still further provides, in the case where the first body of data corresponds to a first application and the second body of data corresponds to a second application, for certifying the second application if the first application is certified and the first check and second check code are equal.

The present invention still further provides a system for comparing a first body of data and a second equivalent body of data, the system comprising a memory component configured to store the first body of data and the equivalent second body of data; a subset selection component configured to select a first proper subset of the contents of the first body of data and a second equivalent proper subset of the contents of the second equivalent body of data, the extent of the first proper subset and the second equivalent proper subset being determined from a semantic analysis of the first body of data; a computation component configured to apply an algorithm to the first proper subset of the contents of the first body of data to generate a first check code and to apply the algorithm to the second equivalent proper subset of the second equivalent body of data to generate a second check code; and a check code comparison component configured to compare the first check code and the second check code.

The present invention still further provides a system for comparing a first body of data and a second equivalent body of data, the system still further comprising a semantic analysis component configured to perform a semantic analysis on a first body of data; a criterion selection component configured to select a list of criteria; a determination component configured to determine if any modification of a semantic sub-element of a first body of data violates at least one criterion in a list of criteria; and a mask generation component configured to generate a mask that includes each and every semantic sub-element of a first body of data for which any modification of the semantic sub-element violates at least one criterion in a list of criteria.

The present invention still further provides a system for comparing a first body of data and a second equivalent body of data wherein the selection component is further configured to select a proper subset of a body of data by using a mask generated by the mask generation component.

The present invention still further provides a system, in the case where the first body of data corresponds to a first application and the second body of data corresponds to a second application, for certifying the second application if the first application is certified and the first check and second check code are equal.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
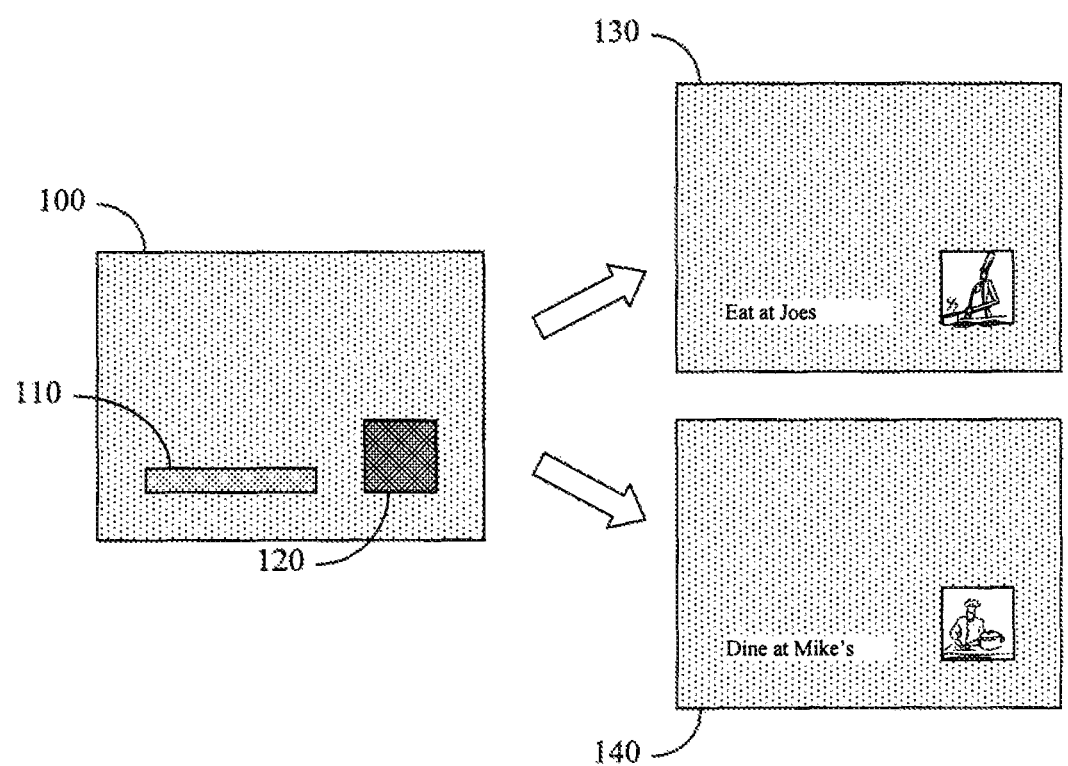
FIG. 1 depicts two exemplary iTV applications derived from a common application framework.

By way of overview, embodiments of the present invention provide a method and system for comparing two bodies of data.

As used herein, the term "body of data" is intended to refer to one of more bytes of digital information stored in volatile or non-volatile memory. Multiple bytes of data may be stored in a single block or file, or may be stored in multiple blocks or files or any combination thereof. Further, the data may be stored in uncompressed form, or may be stored in compressed form and exist in uncompressed form only within volatile memory while being operated upon by an algorithm or component.

As used herein, the term "mask" is intended to refer to a secondary body of data that serves to divide the contents of a primary body of data into two non-intersecting sets, namely those that are included by the mask and those that are excluded by the mask. An empty mask excludes all of the contents of the primary body of data with which it is associated. When a sub-element of a primary body of data is added to a mask, the sub-element becomes part of the included portion of the contents of the primary body of data.

As used herein, the term "proper subset" is intended to refer to a set of some but not all of the contents of a body of data.

As used herein, the term "equivalent" is intended to refer to the following conditions: If a first body of data comprises a set of semantic sub-elements, and a second body of data comprises the same set of semantic sub-elements in the same sequence albeit with possibly different content in one or more of the semantic sub-elements, then the two bodies of data are equivalent. If a first proper subset is constructed from some but not all of the semantic sub-elements of a first body of data, and a second proper subset is constructed from the same set of some but not all of the corresponding semantic sub-elements of a second equivalent body of data, then the first proper subset and second proper subset are equivalent. Two equivalent bodies of data need not have the same size.

As used herein, the terms "validate" and "validation" are intended to refer to the process of determining that a body of data that has undergone one or more transformations has not been modified, or has been modified in an expected and acceptable way. An exemplary method of validation may proceed by the application of an algorithm to some or all of the body of data prior to transformation, resulting in a first secondary datum; the algorithm may be applied to the transformed body of data to generate a second secondary datum; and the first and second secondary data may be compared.

As used herein, the terms "validation code", "check code", and "checksum" are used interchangeably and are intended to refer to a secondary datum generated by applying a validation algorithm to the some or all of the contents of a body of data. The size of a check code (the number of bits or bytes in the check code) is determined by the validation algorithm. The validation algorithm used to compute a checksum need not involve a summation operation.

As used herein, the terms "certify" and "certification" are intended to refer to the process of evaluating the appearance and behavior of an application according to a set of criteria. An application may be "partially certified" if the appearance and behavior of the application meet a subset of the set of criteria for certification. An example of a certification criterion is that an iTV application terminate if the STB is tuned to a service (channel) different than that containing the application.

As used herein, the term "semantic" is intended to refer to the meaning associated with a set of data or symbols. A semantic analysis is contrasted with a syntactic analysis, the latter of which is based upon an evaluation of the rules by which a set of data or symbols is constructed. To illustrate, a syntactic analysis of a sequence of character bytes representing English text would involve grouping the characters into words, the words into sentences, and the sentences into paragraphs; by contrast, a semantic analysis of the content would utilize the results of the syntactic analysis to assign linguistic meaning and interpretive weight to the particular sequence of words, sentences and paragraphs. As used herein, the term "semantic analysis" is not intended to refer to the following trivial operation: In certain data transmission schemes, a body of data to be transmitted may need to be expanded to an integer multiple of a fixed block size by appending padding or stuffing bytes to the body of data. In such schemes, the mere partition of a transmitted or received block of data into a first portion of information content and a second portion of stuffing content does not constitute semantic analysis. For a body of data to be amenable to semantic analysis, a specification must exist that defines the allowable syntax of the body of data and ascribes meaning to the sub-elements of the body of data exclusive of their mere syntactic definition.

As used herein, the term "component" is intended to refer to an entity related to a digital computational process, either hardware, software, a combination of hardware and software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers.

The various aspects of the claimed subject matter are now described with reference to the annexed drawings. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. Additionally it should be appreciated that a carrier wave can be employed to carry computer-readable electronic data such as those used in transmitting and receiving electronic mail or in accessing a network such as the Internet or a local area network. Of course, those skilled in the art will recognize many modifications may be made to this configuration without departing from the scope or spirit of the claimed subject matter.

Figure 2:
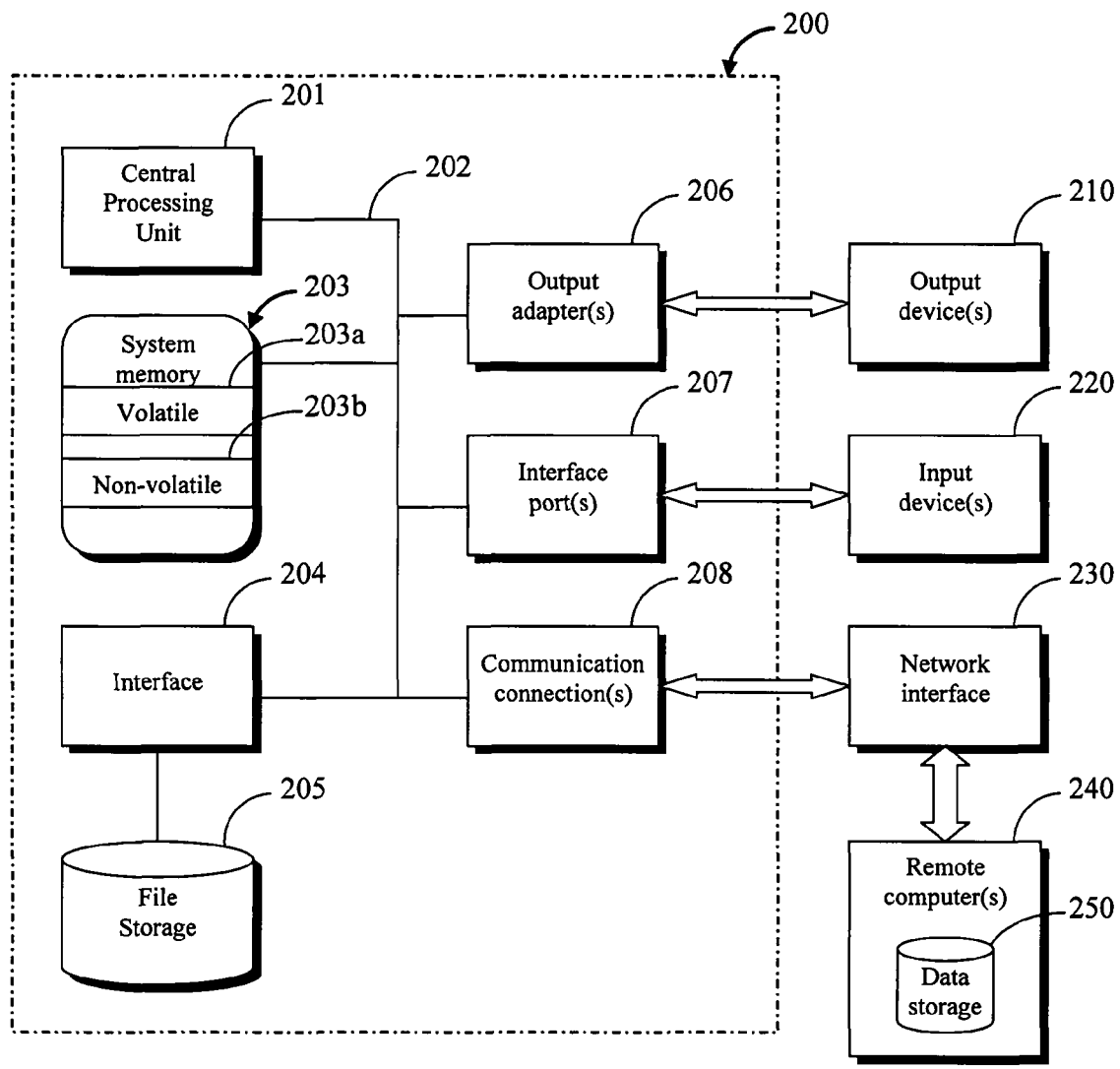
FIG. 2 depicts an exemplary computer system configured to practice the inventive method.

FIG. 2 shows the components of a workstation computer 200 that can be programmed or constructed to implement the steps of the inventive method. Central processing unit 201 is attached to system bus 202 which carries instructions and data among various elements. Central processing unit 201 executes instructions read from system memory 203. Software code and data may be stored in volatile memory 203a or non-volatile memory 203b. Workstation computer 200 optionally includes an interface component 204 that reads and writes files from a file storage component 205. File storage component 205 may comprise a removable or non-removable storage element using magnetic, optical, opto-magnetic, resistive, or other non-volatile storage methodology. Workstation computer 200 includes output adapter(s) 206 that communicates with output device(s) 210, which may include a display terminal, audio speaker, printer, or other device. The communication between an output adapter 206 and an external output device 210 may be wired or wireless. Workstation computer 200 includes interface port(s) 207 that communicates with input device(s) 220, which may include a keyboard, mouse, pointing tablet, scanner, or other device. The communication between an input adapter 207 and an input device 220 may be wired or wireless. Workstation computer 200 may optionally include communication connection (s) 208 that communicates through a network interface 230 to remote computer(s) 240. A remote computer may include data storage 250 which may comprise non-volatile memory, disk storage, or other persistent storage system.

Workstation computer 200 may be employed to compute a check code for a body of data. The body of data may be stored in system memory 203, or may be retrieved from internal storage component 205, or may be retrieved from data storage 250 incorporated into remote computer 240 through means of communication connection 208. The code implementing the validation algorithm computation may be stored in system memory 203, and the resulting check code may be stored in system memory 203 or internal storage component 205, or may be communicated to a remote computer 260 for subsequent use or for storage in external data storage 250.

The computation of check codes for validation is sometimes utilized when a body of data is transformed from one form to another. In the case of an iTV application, one such transformation occurs when the binary content of an application is converted from a stored memory format such as magnetized domains in a hard disk driver, into the form of electromagnetic waves broadcast through a wired or wireless connection to a receiver such as an STB and therein converted back into a memory representation of the binary content. The encrypted certification code described above is commonly used to ensure against alternation of content as a result of this transformative process, more specifically to ensure that the received binary content is identical to the original stored memory content.

Another example of data transformation that is of more relevance to the current invention is the transformation that might arise as a result of changing the binary content of an application from one form (exemplified by application 130 in FIG. 1) into a closely-allied form (exemplified by application 140 in FIG. 1). An exemplary implementation of the inventive method provides a process for computing a check code such that if the original data meets a set of criteria, the transformed data meets the same set of criteria, even if the transformed data are not identical with the original data.

To further clarify the inventive method, the following discussion will consider an exemplary implementation of the inventive method in which the data to be transformed comprise an executable application in the form of one or more Enhanced Television-Binary Interchange Format (ETV-BIF) modules. The ETV-BIF binary format and the behavioral requirements for a compliant ETV-BIF user agent are defined by OpenCable specification OC-SP-ETV-BIF1.0-I04-070921 "Enhanced TV Binary Interchange Format 1.0" issued by Cable Television Laboratories Inc., Louisville, Colo., incorporated herein by reference.

Briefly, an ETV-BIF executable application consists of one or more resource modules that are broadcast to a receiver executing a user agent application. The resource modules are received and interpreted by the user agent application to create the appearance and behavior of the ETV-BIF executable application. An ETV-BIF executable application includes at least one page resource module. A page resource module contains a series of tables that define an object hierarchy constructed from the various native objects ("widgets") defined by the ETV-BIF standard; color data used when displaying graphical content on the television screen attached to the receiver; optional references and optional variables that contain static or dynamic values used during the execution of the application to control application appearance or behavior; optional event function code that is executed in response to events; optional resource locators to locate broadcast modules, internal resources, or external resources for use by the application; and optional data used to control application appearance and behavior. An ETV-BIF executable application may also include one or more data resource modules, each of which contains one or more data tables used by the application. In addition, image or font resource modules may be broadcast for use by an execution application. Additional signal and trigger data may be broadcast to the user agent during execution to control user agent and application behavior. Data, image and font resources may be updated in the broadcast stream during the execution of an application. Prior to broadcast, an ETV-BIF application will typically be certified by comparing the appearance and behavior of the application against a specific set of criteria established by the network operator that will broadcast the application.

Figure 3:
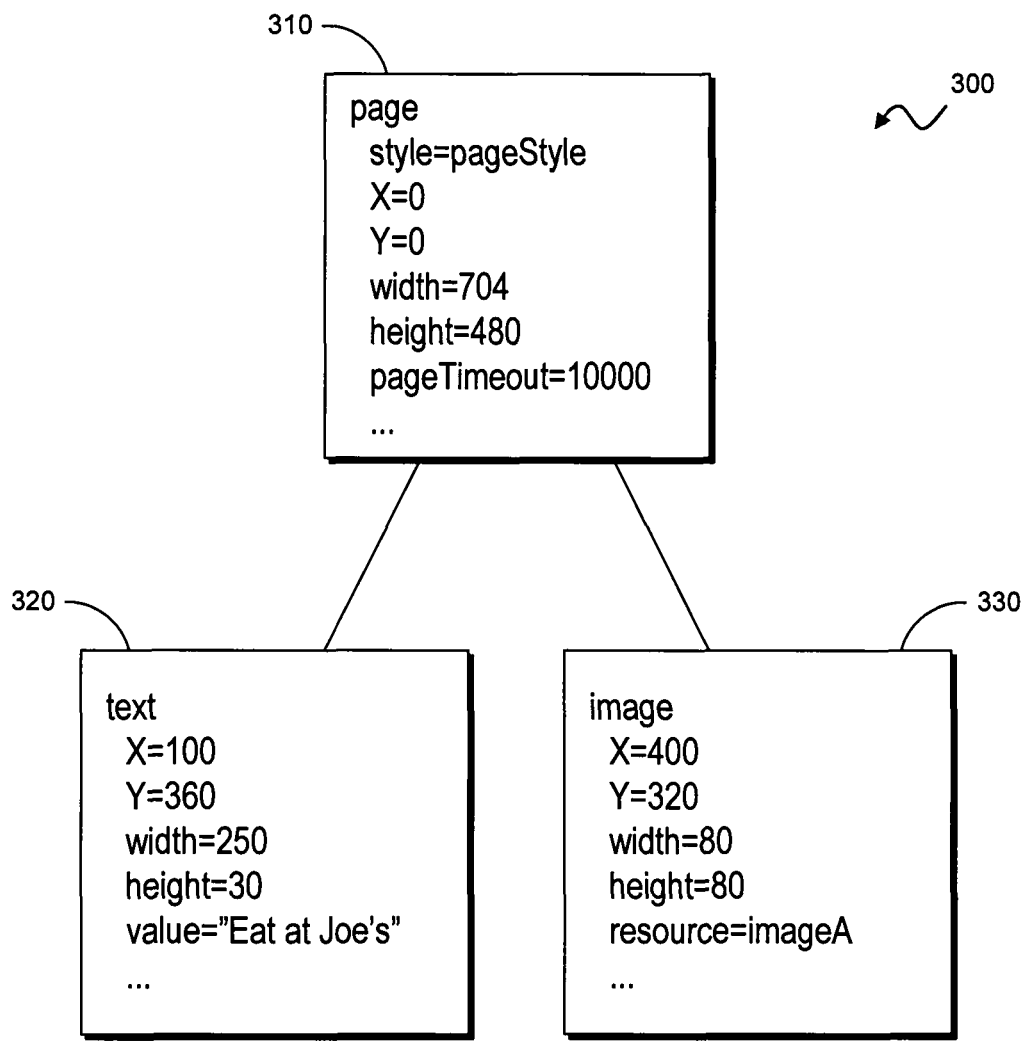
FIG. 3 depicts an exemplary ETV-BIF implementation of an iTV application.

FIG. 3 illustrates an exemplary implementation of an iTV application 100 using the ETV-BIF standard. Application widget hierarchy 300 comprises a single page widget 310, which is the parent of a text widget 320 that corresponds to text banner 110, and an image widget 330 that corresponds to image 120. The visual content of the application is determined by the 'value' property of the text widget and the 'resource' property of the image widget. In the example the 'resource' property of the image widget is set to 'imageA', which refers to a PNG image file that is encoded into the binary resource constituting the ETV-BIF application. The behavior of the application is achieved by setting the 'pageTimeout' property of page widget 310 to an appropriate value (10,000 milliseconds in the example) such that when the designated period of time elapses without user action, the application automatically terminates.

Figure 4:
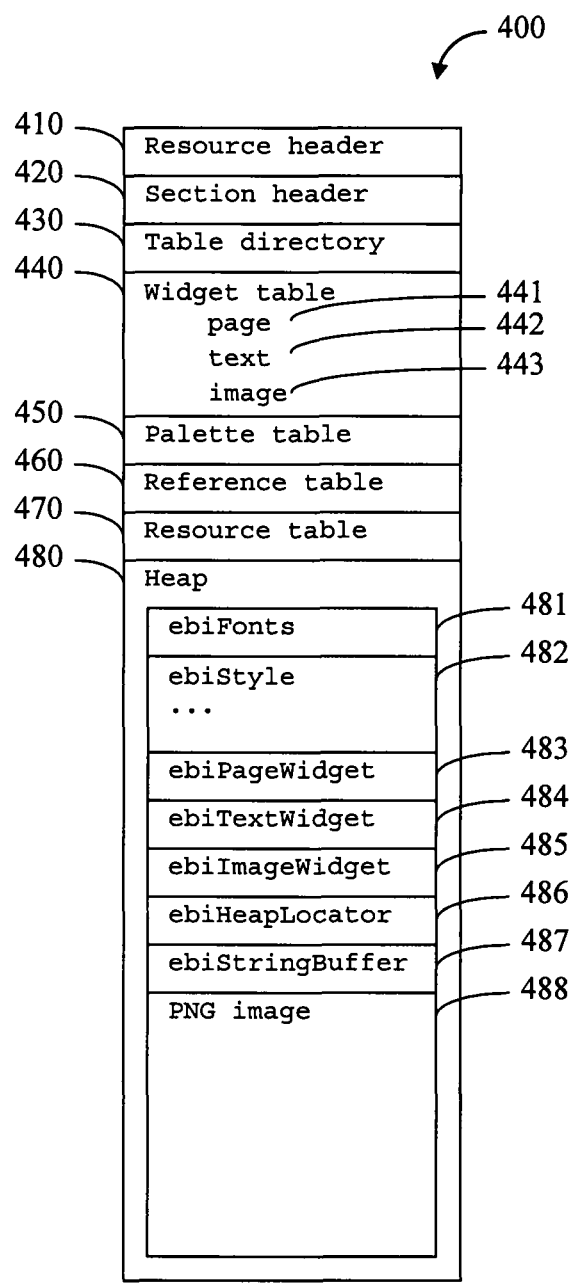
FIG. 4 depicts an exemplary ETV-BIF binary representation of an iTV application depicted in FIG. 3.

FIG. 4 depicts an exemplary encoding of widget hierarchy 300 into a single ETV-BIF-compliant page resource 400. Page resource 400 comprises resource header 410; section header 420; table directory 430; four tables 440, 450, 460, 470; and heap 480. Resource header 410 identifies the body of data as an ETV-BIF page resource. Section header 420 signals the size of the section and the position and length of heap 480 within the section data. Table header 430 signals the number, type and offset of the four tables 440, 450, 460, 470 comprising the section. Widget table 440 identifies the initial (and only) page widget 441 and its child widgets 442, 443. Widget table 440 contains offsets that signal the position within section heap 480 of the structures 483, 484, 485 encoding the widget hierarchy. Structure ebiPageWidget 483 encodes the properties of page widget 310; structure ebiTextWidget 484 encodes the properties of text widget 320; and structure ebiImageWidget 485 encodes the properties of image widget 330. Palette table 450 defines the colors used when displaying the graphical contents of the application. Reference table 460 contains two entries, one that signals the heap offset of ebiStringBuffer structure 487 and one that signals a resource identifier. Resource locator table 470 contains a single entry that associates the resource identifier with ebiHeapLocator structure 486. The ebiHeapLocator structure 486 in turn contains the heap offset of PNG image resource 488. The txwValue field of ebiTextWidget structure 484 contains the index of the reference table entry for ebiStringBuffer structure 487. The iwResource field of ebiImageWidget structure 485 contains the index of the reference table entry for the resource identifier associated with ebiHeapLocator structure 486. The structure and content of page resource 400 may be more fully appreciated by reference to OC-SP-ETV-BIF1.0-I04-070921.

Figure 5:
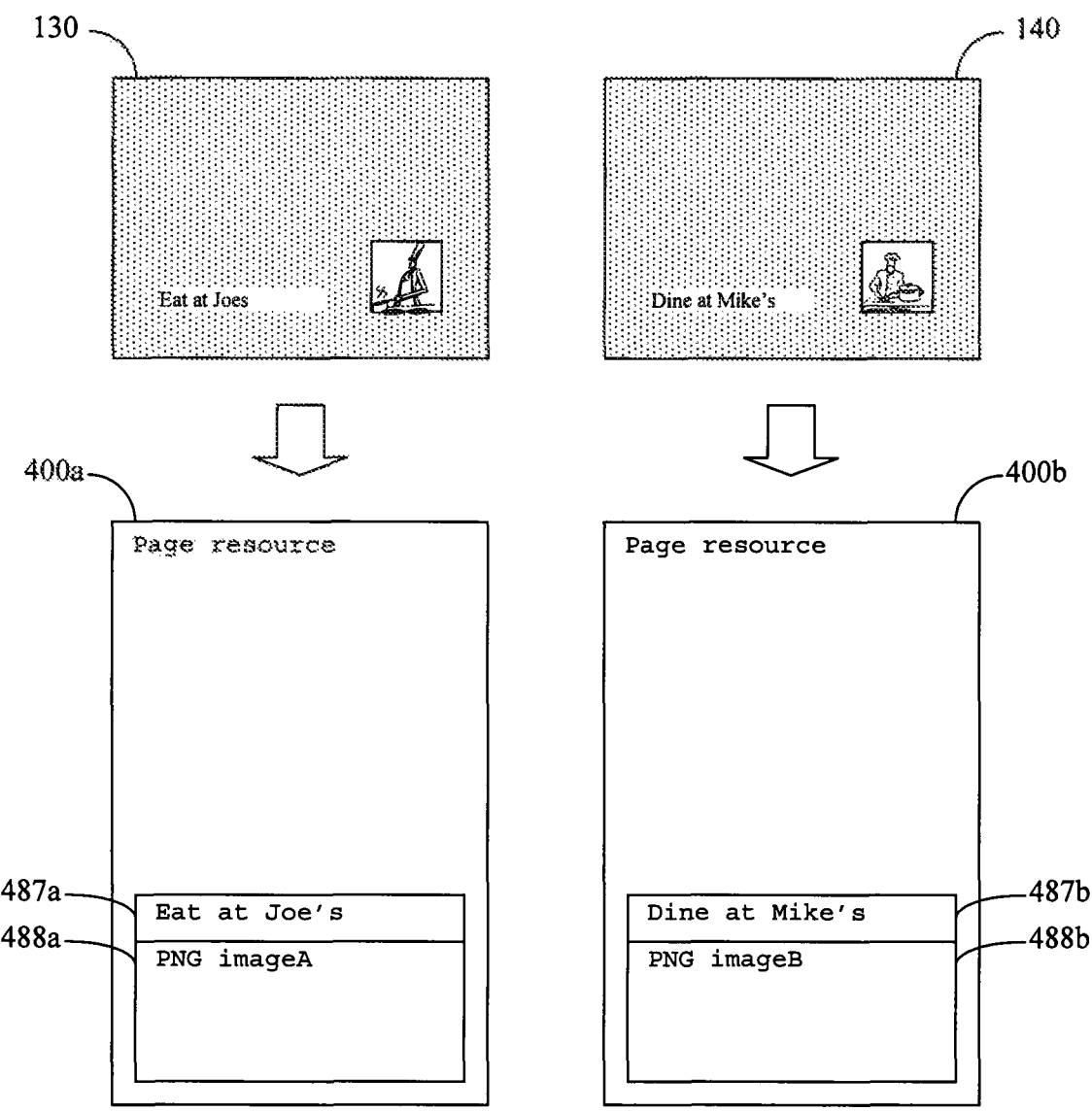
FIG. 5 compares exemplary ETV-BIF binary representation of two iTV applications depicted in FIG. 1.

Widget hierarchy 300 and ETV-BIF page resource 400 are suitable for encoding both applications 130 and 140 depicted in FIG. 1. As described above, the differences between applications 130 and 140 are limited to the textual content displayed by text widget 320 (encoded in ebiStringBuffer structure 487) and the image content displayed by image widget 330 (encoded in PNG image buffer 488). FIG. 5 schematically compares page resource 400a generated from application 130 with page resource 400b generated from application 140. The textual content of application 130 ("Eat at Joe's") is encoded in ebiStringBuffer structure 487a, while the textual content of application 140 ("Dine at Mike's") is encoded in ebiStringBuffer structure 487b. The image content of application 130 (imageA) is encoded in PNG image buffer 488a, while the image content of application 140 (imageB) is encoded in PNG image buffer 488b. Judicious encoding of the page resources 400a, 400b could allocate sufficient heap space in ebiStringBuffer structure 487 and PNG image buffer 488 so that the only differences between page resources 400a and 400b would be within those portions of the resources.

An exemplary implementation of the inventive method can now be described with reference to FIG. 5. From an analysis of the content of page resource 400a, a mask can be constructed that excludes the contents of ebiStringBuffer 487a and PNG image buffer 488a and includes the remainder of the content of page resource 400a. The mask would include those portions of the content of page resource 400a that define the general appearance and behavior of application 130, including inter alia the location, size, and style of the text and image regions; the font face, size, weight, and color of textual display within the text region; and the behavior of the application, including the period of time required for application timeout. Only the specific textual and image content would be excluded by the mask. By the inventive method, the mask would then be applied to the data content of page code algorithm to only those data included by the mask. Given the judicious encoding described above, page resource 400a and page resource 400b are equivalent. Therefore, the same mask could be applied to the data content of page resource 400b, again excluding only the specific textual and image content, and a second check code computed. If the masked check codes computed for page resource 400a, 400b are identical, the resources can be judged to be identical under the masking condition.

In the exemplary implementation of the inventive method applied to the case depicted in FIG. 5, the semantic analysis of the data content of page resource 400a would be based on the specification for the content of an ETV-BIF binary resource. Specifically, the analysis would determine the location and extent of those portions of the data content encoding features of appearance and behavior that are relevant to specific external criteria, such as the specific criteria required to quality for broadcast certification. In this exemplary case, the significant portions of the content of page resource 400 are those encoding the resource header 410, section header 420, table directory 430, widget table 440, palette table 450, reference table 460, resource locator table 470, and heap structures 481, 482, 483, 484, 485, and 486. Only heap structures 487 and 488 would be excluded by the semantic analysis.

In an alternative example, the criteria for broadcast certification might be insensitive to some or all of the specific colors used when displaying application content. In this case the analysis might exclude some or all of the content of palette table 450.

In the exemplary case described above, the encoding of page resources 400a and 400b has been significantly constrained by requiring that the string buffer 487a, 487b and PNG image buffer 488a, 488b in the two resources be identical in size. In an alternative example, this constraint might be relaxed. Allowing the size of the string buffer 487 and PNG image buffer 488 to vary could result in a number of minor subsidiary changes to the page resource that might be judged to be inconsequential with respect to the criteria for broadcast certification. For example, changing the sizes of string buffer 487 and PNG image buffer 488 affect the total size of heap 480, which is encoded in a field in section header 420; and affect the values for the offset and size of PNG image buffer 488, which are encoded in epiHeapLocator structure 486. In the alternative case where the string buffer 487 and PNG image buffer 488 are allowed to vary in size, the generation of the mask would be more complex and would require the exclusion of relevant portions of section header 420 and epiHeapLocator structure 486.

Figure 6:
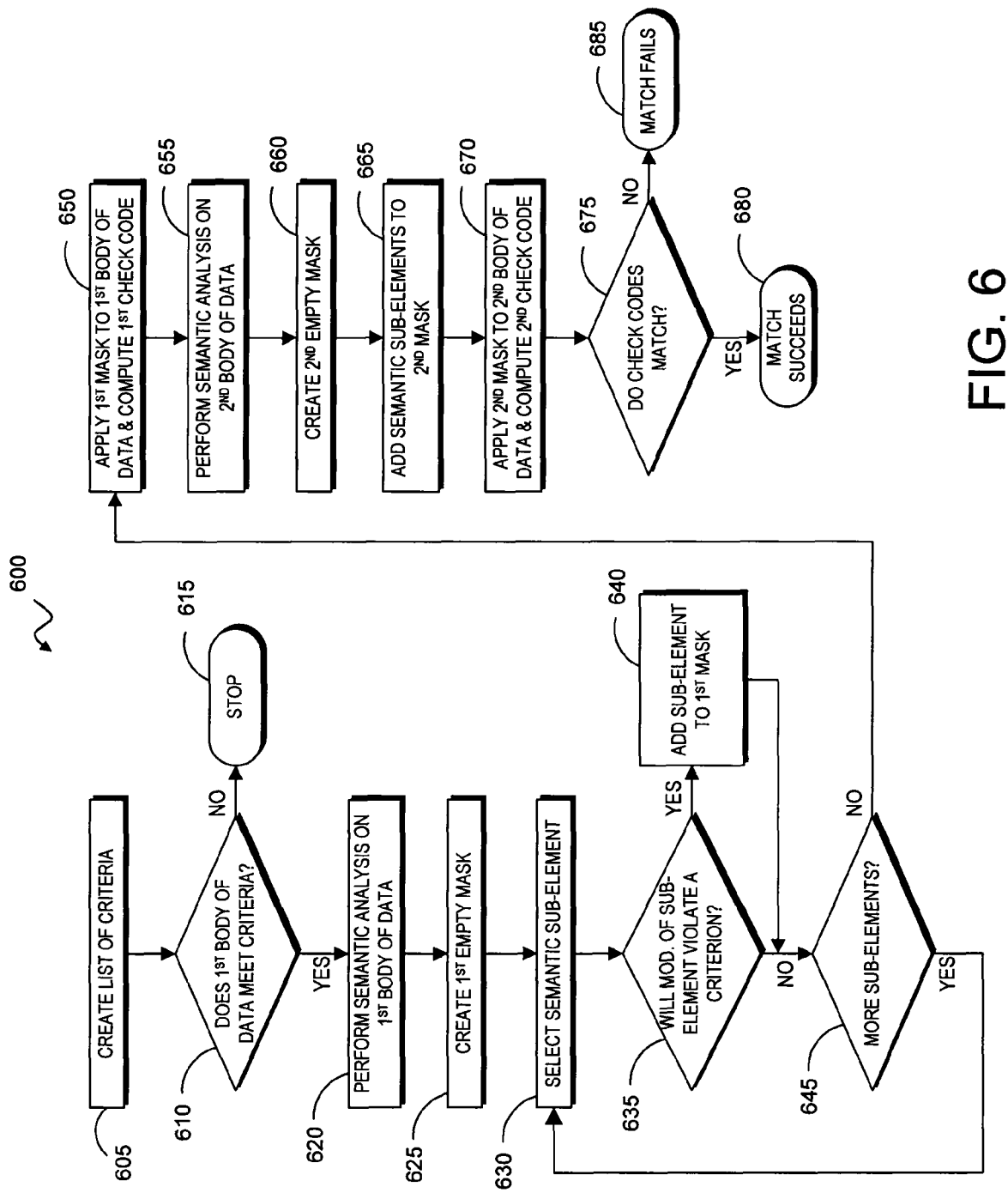
FIG. 6 depicts an exemplary flowchart implementing the inventive method.

FIG. 6 depicts a flowchart 600 of an exemplary implementation of the inventive method. In this exemplary implementation, two bodies of data are being compared to ensure that both bodies of data meet a list of criteria. At a step 605 a list of criteria is created that the bodies of data must meet. At a step 610, a test is made to determine if the first body of data meets all of the criteria in the list of criteria. If the first body of data does not meet all of the criteria, then at a step 615 the process stops. If the first body of data does meet all of the criteria, then at a step 620 a semantic analysis is performed on the first body of data. A semantic analysis is performed on a body of data by decomposing the body of data down into constituent sub-elements, then determining the meaning of and relationship among all of the sub-elements. By way of example, a semantic analysis of a set of ETV-BIF modules would include dividing the modules into a set of constituent structures and data resource blocks, determining the values of the members of all the structures, and determining the inter-relationships among the structures and the resource blocks.

Once a semantic analysis is performed, at a step 625 a first empty mask is created that corresponds in extent to the first body of data. At a step 630 a semantic sub-element is selected. At a step 635, a determination is made whether any modification of the semantic sub-element selected at step 630 would violate any criterion in the list of criteria created at a step 605. If the determination is that any modification of the semantic sub-element would violate at least one of the criteria, then at a step 640 the semantic sub-element is added to the first mask. At a step 645, a determination is made whether any more semantic sub-elements remain to be evaluated. If at least one semantic sub-element remains to be evaluated, step 630 is repeated.

If no more semantic elements remain to be evaluated, at a step 650 the first mask is applied to the first body of data, and a first check code is computed from the data included by the first mask. At an optional step 655, a semantic analysis of the second body of data is performed. At an optional step 660, a second empty mask is created that corresponds in size to the second body of data. At an optional step 665, each of the semantic sub-elements of the second semantic analysis that correspond to semantic sub-elements of the first analysis that were added to the first mask at step 640 are added to the second mask. Optional steps 655, 660, 665 are not required if the semantic sub-elements of the second body of data are identical in sequence and size to the semantic sub-elements of the first body of data, in which case the second mask is simply a copy of the first mask. At a step 670, the second mask is applied to the second body of data and a second check code is computed from the data included by the second mask. At a step 675 the first and second check codes are compared. If the check codes are equal, then at a step 680 the process signals a successful match. If the check codes are not equal, then at a step 685 the process signals an unsuccessful match. One skilled in the art will recognize that if the first body of data meets the criteria used to create the first mask and the process 600 signals a successful match, then the second body of data meets the same criteria. If the first body of data corresponds to an application and the second body of data corresponds to an application, then process 600 serves to certify the second application if the first application is certified and the first and second check codes are equal.

In the example depicted in FIG. 1, the two bodies of data to be compared exist at the same time, and the transformation between the two bodies of data is the modification of the application content from a first content to a second content. In this exemplary context, the transformation may result in a different in syntax and semantics between the first and second bodies of data. In an alternative embodiment of the inventive method, the transformation of a first body of data into a second body of data may be as a result of the transmission or broadcast of the body of data from a first location to a second location. In this alternative embodiment, differences between the original body of data and the transformed body of data may be the result for example of random errors resulting from noise in the transmission or broadcast process, or the result of deliberate tampering with the transmission or broadcast process. In this alternative embodiment, the expected result of the transformation is that the syntax and semantics of the body of data is not modified by the transformation process. In this case, the semantic analysis may be performed on the original body of data, and a mask created in accordance with a list of criteria. Following the transformation, the mask can be applied to the transformed body of data without requiring a semantic analysis of the transformed body of data.

The term "computer" is used herein to refer to any device with processing capability such that it can execute instructions. Those skilled in the art will realize that such processing capabilities are incorporated into many different devices and therefore the term "computer" includes PCs, servers, mobile telephone, personal digital assistance and many other devices.

The methods described herein may be performed by software in machine readable form on a storage medium. The software can be suitable for execution on a parallel processor or a serial processor such that the method steps may be carried out in any suitable order, or simultaneously.

The description acknowledges that software can be a valuable, separately tradable commodity. The description is intended to encompass software, which runs on or controls 'dumb' or standard hardware, to carry out the desired functions. It is also intended to encompass software which 'describes' or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer or computer network. Those skilled in the art will also realize that by utilizing conventional techniques known to those skilled in the art that all, or a portion of the software instructions may be carried out by a dedicated circuit, such as a DSP, programmable logic array, or the like.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. In a computer system having a processor and memory, a method for comparing a first body of data and a second equivalent body of data by computing a first check code from the first body of data and a second check code from the second equivalent body of data and comparing the first check code and second check code for equality, characterized in that:
   computation of the first check code from the first body of data is performed by applying an algorithm to a proper subset of the first body of data;
   computation of the second check code from the second equivalent body of data is performed by applying the algorithm to the equivalent proper subset of the second equivalent body of data; and
   the extent of the proper subset is determined from a semantic analysis of the first body of data.

2. The method of claim 1, wherein the proper subset of the first body of data is specified by a mask.

3. The method of claim 2, further including the steps of applying the mask to the first body of data and applying the mask to the second equivalent body of data.

4. The method of claim 1, wherein the first body of data includes one or more semantic sub-elements, the method further including determining an extent of the proper subset of the first body of data by comparing each semantic sub-element of the first body of data with a list of two or more criteria.

5. The method of claim 4, wherein a semantic sub-element is included in the proper subset if modification of the semantic sub-element violates at least one criterion in the list of criteria.

6. The method of claim 1, wherein the first body of data corresponds to a first application, and the second body of data corresponds to a second application, the method further including the step of certifying the second application if the first application is certified and the first check code and second check code are equal.

7. A computer system for comparing a first body of data and a second equivalent body of data comprising:
   a memory component configured to store the first body of data and the second equivalent body of data;
   a subset selection component configured to select a first proper subset of the first body of data and a second equivalent proper subset of the second equivalent body of data, the extent of the first proper subset and the second equivalent proper subset being determined from a semantic analysis of the first body of data;
   a computation component configured to apply an algorithm to the first proper subset of the first body of data to generate a first check code and to apply the algorithm to the second equivalent proper subset of the second equivalent body of data to generate a second check code; and
   a check code comparison component configured to compare the first check code and the second check code.

8. The computer system of claim 7, further comprising:
   a semantic analysis component configured to perform a semantic analysis on a first body of data;

a criterion selection component configured to select a list of criteria;

a determination component configured to determine if modification of a semantic sub-element of a first body of data violates at least one criterion in a list of criteria; and a mask generation component configured to generate a mask that includes each and every semantic sub-element of a first body of data for which modification of the semantic sub-element violates at least one criterion in a list of criteria.

9. The computer system of claim 8, wherein the selection component is further configured to select a proper subset of a body of data by using a mask generated by the mask generation component.

10. The computer system of claim 7, further including a certifying component configured to certify a second application, corresponding to the second body of data, when a first application, corresponding to the first body of data, is certified and the first check code and second check code are equivalent.

* * * * *